United States Patent
Liu et al.

(10) Patent No.: US 9,285,529 B2
(45) Date of Patent: Mar. 15, 2016

(54) BACKLIGHT MODULE

(71) Applicant: Wistron Corporation, New Taipei (TW)

(72) Inventors: Chin-Yung Liu, New Taipei (TW); Ming-Hung Tsai, New Taipei (TW)

(73) Assignee: Wistron Corporation, New Taipei (TW)

( * ) Notice: Subject to any disclaimer, the term of this patent is extended or adjusted under 35 U.S.C. 154(b) by 140 days.

(21) Appl. No.: 14/172,916

(22) Filed: Feb. 5, 2014

(65) Prior Publication Data

US 2015/0085520 A1    Mar. 26, 2015

(30) Foreign Application Priority Data

Sep. 22, 2013    (CN) .......................... 2013 1 0432446

(51) Int. Cl.
*F21V 7/04*    (2006.01)
*F21V 8/00*    (2006.01)
*G02F 1/1335*    (2006.01)

(52) U.S. Cl.
CPC ............ *G02B 6/0033* (2013.01); *G02B 6/0001* (2013.01); *G02B 6/0096* (2013.01); *G02F 1/133615* (2013.01)

(58) Field of Classification Search
CPC .. G02B 6/0096; G02B 6/0033; G02B 6/0035; G02B 6/0038; G02B 6/0036; G02F 2001/133607
See application file for complete search history.

(56) References Cited

U.S. PATENT DOCUMENTS

| | | | | |
|---|---|---|---|---|
| 5,150,965 A * | 9/1992 | Fox | .......................... | H01J 61/30 313/1 |
| 5,779,337 A * | 7/1998 | Saito | .................... | G02B 6/0038 362/23.15 |
| 5,961,198 A * | 10/1999 | Hira | ..................... | G02B 6/0036 349/65 |
| 6,454,452 B1 * | 9/2002 | Sasagawa | ............ | G02B 6/0061 349/65 |
| 6,745,506 B2 * | 6/2004 | Maas | ................... | G02B 6/0036 362/604 |

(Continued)

FOREIGN PATENT DOCUMENTS

| CN | 102748655 | 10/2012 |
|---|---|---|
| TW | I269917 | 1/2007 |

(Continued)

*Primary Examiner* — Anh Mai
*Assistant Examiner* — Zachary J Snyder
(74) *Attorney, Agent, or Firm* — Jianq Chyun IP Office

(57) ABSTRACT

A backlight module includes a back plate, an optical film, a light source and optical microstructures. The back plate has a supporting surface. The optical film is disposed on the back plate. The supporting surface and the optical film have a gap therebetween. The light source disposed on the supporting surface is adapted to emit light toward the optical microstructures. Each optical microstructure includes first and second transparent structures. The first transparent structure connected to the supporting surface has front and rear ends. The front end facing toward the light source has a first concave surface. The rear end facing away from the light source has a convex surface. The second transparent structure connected to the first transparent structure has front and rear surfaces tilted in relative to the supporting surface. The front surface faces toward the light source, and the rear surface faces away from the light source.

15 Claims, 11 Drawing Sheets

(56) References Cited

U.S. PATENT DOCUMENTS

| | | | | | |
|---|---|---|---|---|---|
| 7,252,427 | B2* | 8/2007 | Teng | ................... | G02B 6/0038 362/339 |
| 7,322,733 | B2* | 1/2008 | Chang | ................... | G02B 6/0036 362/331 |
| 7,374,329 | B2* | 5/2008 | Feng | ................... | G02B 6/0016 349/65 |
| 7,397,984 | B2* | 7/2008 | Kuo | ................... | H04N 9/3141 348/E5.138 |
| 7,712,932 | B2* | 5/2010 | Parker | ................... | F21V 5/00 359/599 |
| 7,740,391 | B2* | 6/2010 | Lai | ................... | G02B 6/0068 362/555 |
| 7,819,558 | B2* | 10/2010 | Parker | ................... | F21V 5/00 362/330 |
| 7,839,466 | B2* | 11/2010 | Shih | ................... | G02F 1/133611 349/61 |
| 7,956,953 | B2* | 6/2011 | Chang | ................... | G02B 6/0038 349/62 |
| 8,100,548 | B2* | 1/2012 | Shen | ................... | G02F 1/133608 362/317 |
| 8,118,464 | B2* | 2/2012 | Chang | ................... | G02B 6/0036 362/608 |
| 8,132,929 | B2* | 3/2012 | Harton | ................... | F21V 5/002 340/815.55 |
| 8,529,116 | B2* | 9/2013 | Tsai | ................... | G02B 6/0036 315/39 |
| 9,063,367 | B2* | 6/2015 | Hu | ................... | G02F 1/133504 |
| 9,086,592 | B2* | 7/2015 | Yang | ................... | G02F 1/133603 |
| 2001/0049893 | A1* | 12/2001 | Maas | ................... | G02B 6/0036 40/544 |
| 2002/0080598 | A1* | 6/2002 | Parker | ................... | G02B 6/0021 362/616 |
| 2004/0120161 | A1* | 6/2004 | Hwang | ................... | G02F 1/133608 362/558 |
| 2005/0270795 | A1* | 12/2005 | Lai | ................... | G02F 1/133608 362/558 |
| 2006/0034099 | A1* | 2/2006 | Yang | ................... | G02B 6/0038 362/615 |
| 2006/0181901 | A1* | 8/2006 | Sakai | ................... | G02B 6/0096 362/613 |
| 2007/0147036 | A1* | 6/2007 | Sakai | ................... | G02B 6/0096 362/240 |
| 2007/0279936 | A1* | 12/2007 | Song | ................... | G02F 1/133605 362/613 |
| 2010/0142220 | A1* | 6/2010 | Lee | ................... | G02B 6/0053 362/609 |
| 2010/0142225 | A1* | 6/2010 | Kurihara | ................... | G02B 6/0036 362/621 |
| 2010/0157577 | A1* | 6/2010 | Montgomery | ................... | G02B 6/0018 362/97.2 |
| 2010/0321610 | A1* | 12/2010 | Tanaka | ................... | G02F 1/133606 349/62 |
| 2012/0275192 | A1* | 11/2012 | Wakamura | ................... | G02B 6/0036 362/613 |

FOREIGN PATENT DOCUMENTS

| | | |
|---|---|---|
| TW | I271581 | 1/2007 |
| TW | 201144911 | 12/2011 |
| TW | I354838 | 12/2011 |

\* cited by examiner

BACKLIGHT MODULE

CROSS-REFERENCE TO RELATED APPLICATION

This application claims the priority benefit of China application serial no. 201310432446.7, filed on Sep. 22, 2013. The entirety of the above-mentioned patent application is hereby incorporated by reference herein and made a part of this specification.

BACKGROUND

1. Field of the Application

The invention relates to a backlight module, and more particularly, to a backlight module having optical microstructures.

2. Description of Related Art

Current electronic devices mostly utilize flat panel display modules for performing screen display, among which technology in liquid crystal display (LCD) module is more proficient and popularized. However, since display panel of the LCD module is unable to emit light by itself, a backlight module is disposed underneath the display panel for providing light required by the display screen. In some electronic devices, backlight modules without light guide plate are being adapted to save assembly costs and reduce device weight.

In conventional backlight module without light guide plate, an optical film and a back plate thereof have a gap therebetween, thereby forming an air layer. Light emitted by light source, after being transmitted within the air layer that has no physical object, passes through the optical film so as to be emitted out. Under the design method of backlight module without light guide plate, light emission uniformity has to be enhanced by adjusting a distance between the back plate and the optical film; however, this may cause the backlight module to become difficult in thinning. In addition, since the air layer is unable to support the optical film, the optical film is susceptible to subsidence deformation, thereby influencing light emission quality.

SUMMARY OF THE APPLICATION

The invention provides a backlight module having a smaller thickness and favorable light emission quality.

A backlight module of the invention includes a back plate, at least one optical film, a light source and a plurality of optical microstructures. The back plate has a supporting surface. The optical film is disposed on the back plate. The supporting surface and the optical film have a gap therebetween. The light source is disposed at an edge of the supporting surface. The optical microstructures are disposed between the supporting surface and the optical film. The light source is adapted to emit light towards the optical microstructures. Each of the optical microstructures includes a first transparent structure and a second transparent structure. The first transparent structure is connected to the supporting surface and has a front end and a rear end opposite to each other. The front end faces toward the light source and has a first concave surface. The rear end faces away from the light source and has a convex surface. The second transparent structure is connected to the first transparent structure and located between the first transparent structure and the optical film. The second transparent structure has a front surface and a rear surface. The front surface faces toward the light source and tilts in relative to the supporting surface. The rear surface faces away from the light source and tilts in relative to the supporting surface.

In an embodiment of the invention, the optical microstructures the optical microstructures are located between the light source and another edge of the supporting surface. When the light passes through each of the optical microstructures, a portion of the light as guided by the first concave surface and the convex surface is transmitted towards the another edge, and another portion of the light as guided by the front surface and the rear surface is transmitted towards the optical film.

In an embodiment of the invention, a height of each of the optical microstructures equals to the gap between the supporting surface and the optical film, so as to enable the second transparent structures to support the optical film.

In an embodiment of the invention, the convex surface is a convex cambered surface.

In an embodiment of the invention, the first concave surface is a concave cambered surface.

In an embodiment of the invention, each of the first transparent structures further has a first side end and a second side end opposite to each other, the first side end is connected between the front end and the rear end and has a second concave surface, and the second side end is connected between the front end and the rear end and has a third concave surface.

In an embodiment of the invention, each of the second transparent structures further has a first side surface and a second side surface opposite to each other, the first side surface is connected between the front surface and the rear surface and titled in relative to the supporting surface, and the second side surface is connected between the front surface and the rear surface and tilted in relative to the supporting surface.

In an embodiment of the invention, each of the second transparent structures further has a first side surface and a second side surface opposite to each other, the first side surface is connected between the front surface and the rear surface and perpendicular to the supporting surface, and the second side surface is connected between the front surface and the rear surface and perpendicular to the supporting surface.

In an embodiment of the invention, each of the second transparent structures is a pyramidal structure.

In an embodiment of the invention, the pyramidal structure has a first end surface and a second end surface opposite to each other, the first end surface is connected to the first transparent structure, the second end surface faces towards the optical film, and an area of the first end surface is greater than an area of the second end surface.

In an embodiment of the invention, the pyramidal structure has a first end surface and a second end surface opposite to each other, the first end surface is connected to the first transparent structure, the second end surface faces towards the optical film, and an area of the first end surface is smaller than an area of the second end surface.

In an embodiment of the invention, each first transparent structure and the corresponding second transparent structure thereof together constitute a pyramidal structure or a conical structure.

In an embodiment of the invention, a disposition density of the optical microstructures gradually increases along a direction away from the light source.

In an embodiment of the invention, the back plate has a plurality of sidewalls, and the sidewalls surround the supporting surface and support the periphery of the optical film.

In an embodiment of the invention, the first transparent structure and the second transparent structure are integrally formed.

In view of foregoing, in the backlight module of the invention, the optical microstructures are disposed on the supporting surface of the back plate, and can guide the light from the light source via structure features, such as the first concave surface, the convex surface, the front surface and the rear surface thereof. In detail, a portion of the light passing through the first transparent structures of the optical microstructures as guided by the first concave surface and the convex surface may be uniformly transmitted to each location on the supporting surface, and a portion of the light passing through the second transparent structures of the optical microstructures as guided by the front surface and the rear surface tilted in relative to the supporting surface may be transmitted to the optical film and passed through the optical film so as to be emitted out. By adjusting the disposition density of the optical microstructures and a titled angle of the front surface and the rear surface, light emission uniformity of the backlight module may be improved. As a result, a distance between the back plate and the optical film is not required to be adjusted for improving the light emission uniformity, and thus a thickness of the backlight module is prevented from being too large, thereby complying with a thinning trend of electronic devices. In addition, the optical microstructures located between the optical film and the supporting surface may support the optical film so as to prevent the optical film from having a subsidence deformation, and thus may ensure the backlight module has favorable light emission quality.

In order to make the aforementioned and other features and advantages of the present application more comprehensible, several embodiments accompanied with figures are described in detail below.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DETAILED DESCRIPTION OF DISCLOSED EMBODIMENTS

Figure 1:
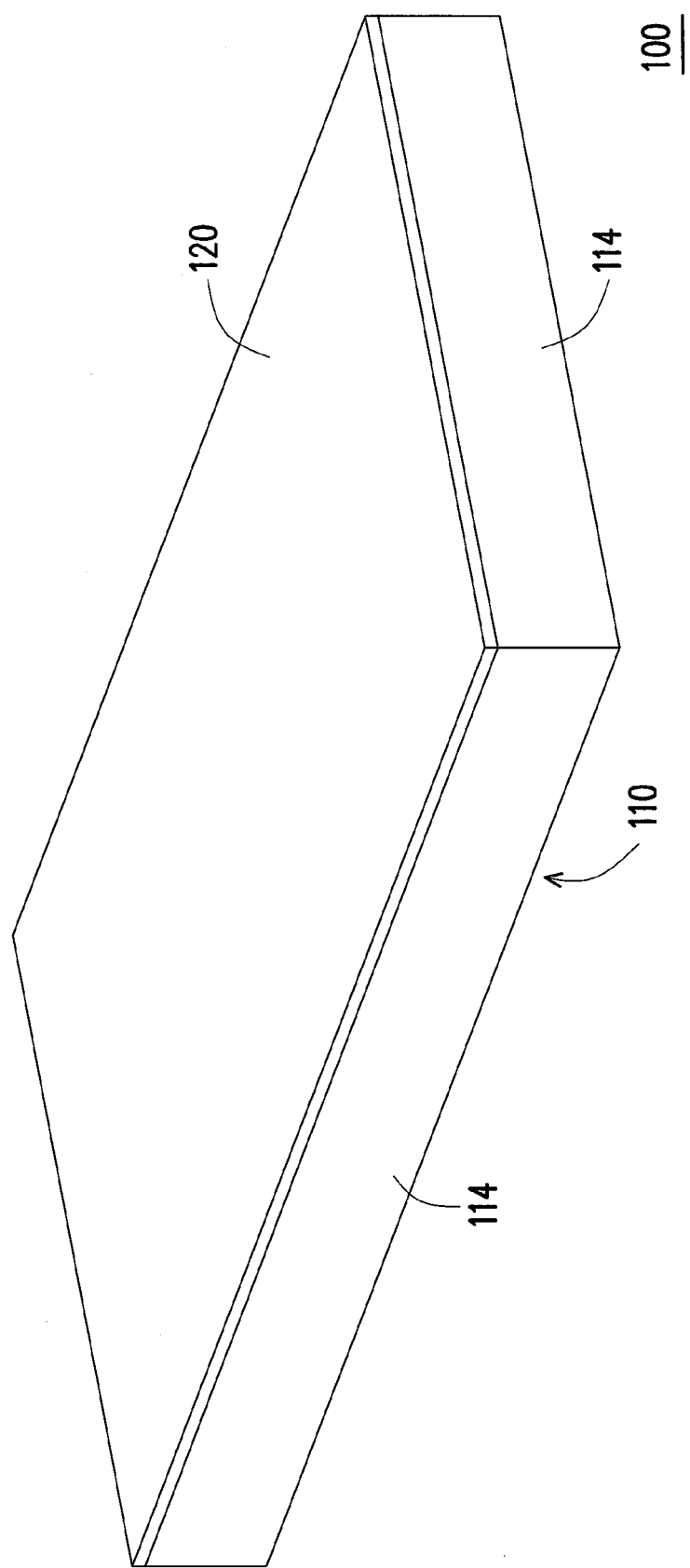
FIG. 1 is a perspective view illustrating a backlight module according to an embodiment of the invention.
Figure 2:
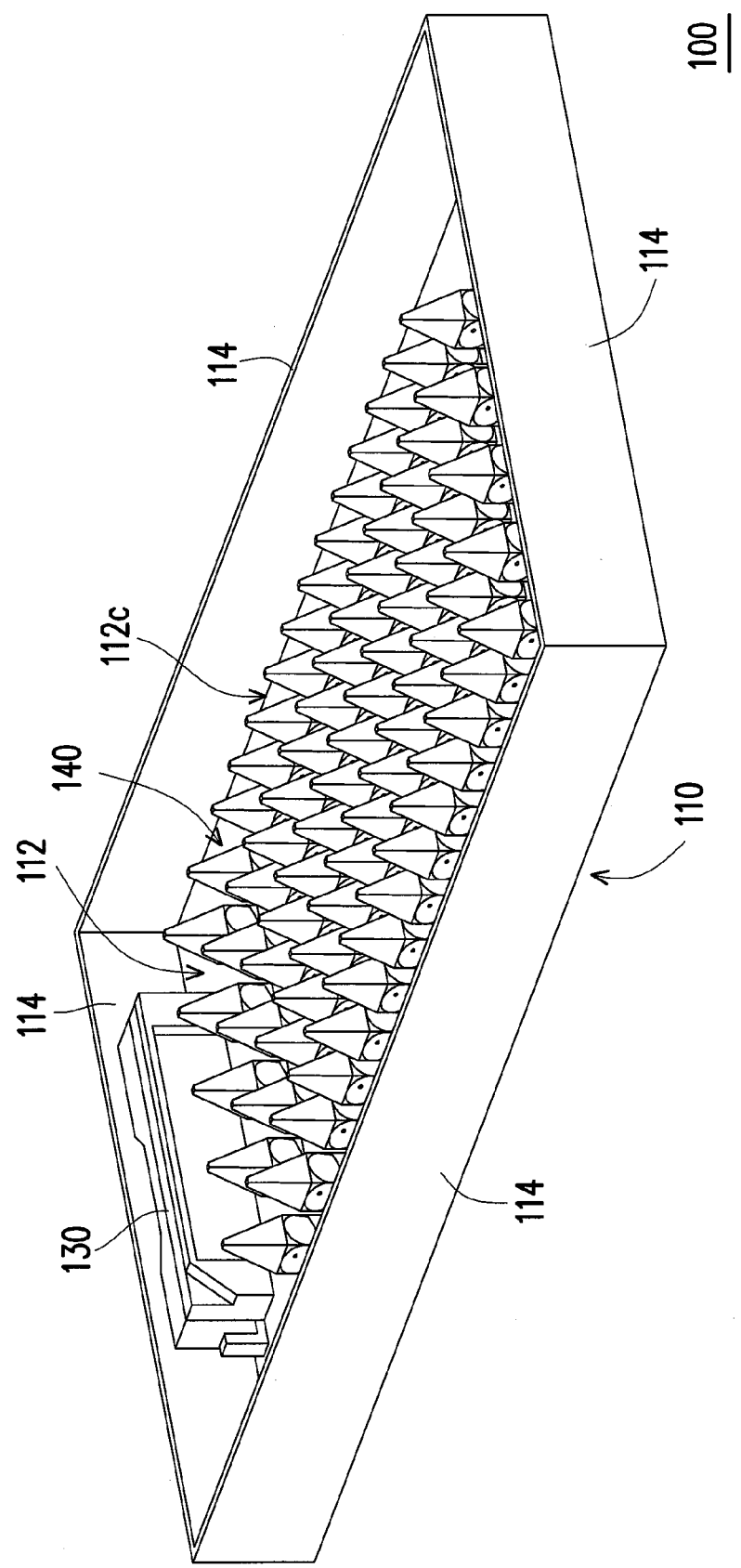
FIG. 2 is a perspective view illustrating partial components of the backlight module of FIG. 1.
Figure 3:
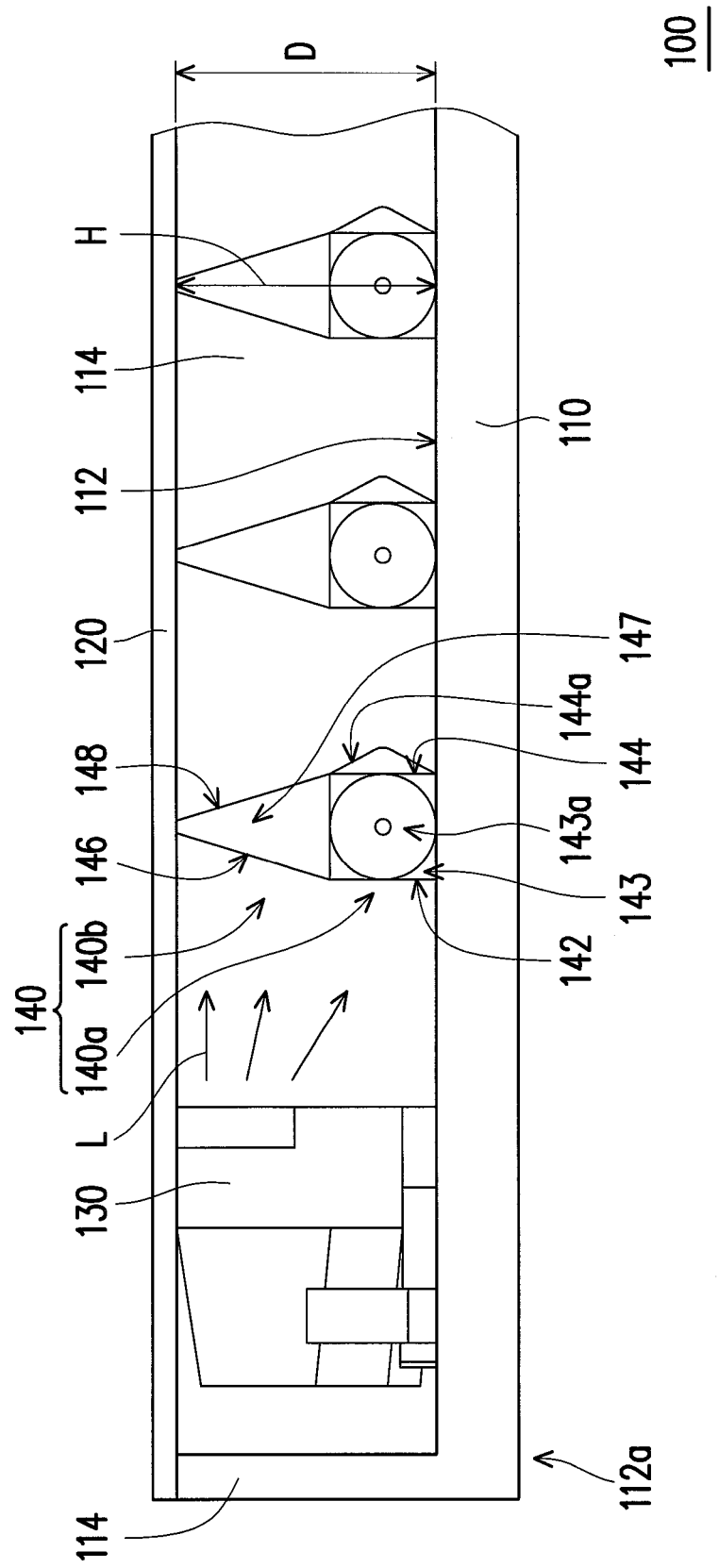
FIG. 3 is partial side view illustrating the backlight module of FIG. 1.

FIG. 1 is a perspective view illustrating a backlight module according to an embodiment of the invention. FIG. 2 is a perspective view illustrating partial components of the backlight module of FIG. 1. FIG. 3 is partial side view illustrating the backlight module of FIG. 1. For clarity of the drawings, optical film 120 shown in FIG. 1 and FIG. 3 is not illustrated in FIG. 2, and parts of the sidewalls shown in FIG. 1 and FIG. 2 are not illustrated in FIG. 3. Referring to FIG. 1 through FIG. 3, a backlight module 100 of the present embodiment, for example, is a backlight module without light guide plate and has a back plate 110, at least one optical film 120 (illustrated as one) and a light source 130. The back plate 110 has a supporting surface 112 and a plurality of sidewalls 114. The light source 130, for example, is a light emitting diode (LED) light source and disposed at an edge 112a of the supporting surface 112. The optical film 120, for example, is a diffusion sheet and disposed on the back plate 110, and the sidewalls 114 surround the supporting surface 112 and support the periphery of the optical film 120, so that the supporting surface 112 and the optical film 120 have a gap D therebetween, thereby forming an air layer. Light L emitted by the light source 130, after beings transmitted and reflected in the air layer between the supporting surface 112 and the optical film 120, passes through the optical film 120 and is emitted out. In other embodiments, the optical film 120 may be plurality in amount and include other types of optical film which are not diffusion sheets, but the invention is not limited thereto.

Figure 4:
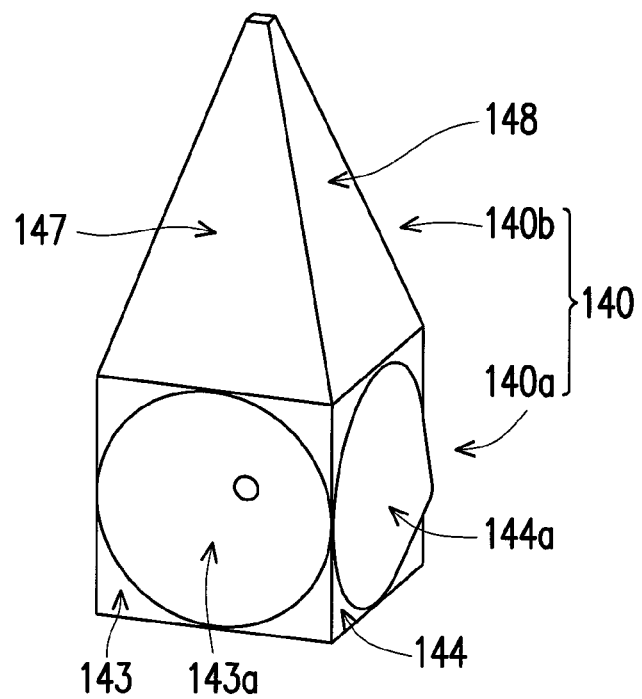
FIG. 4 is a perspective view illustrating an optical microstructure of FIG. 3.
Figure 5:
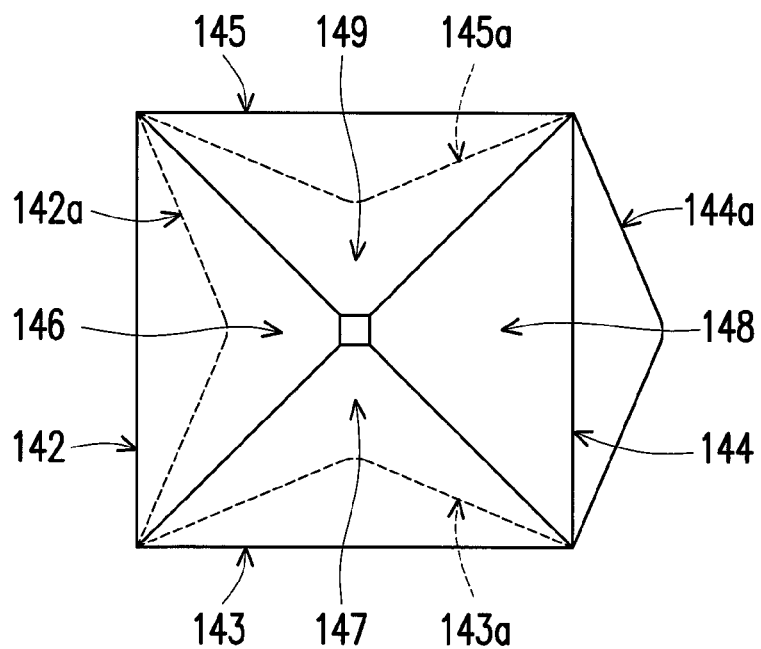
FIG. 5 is a top view illustrating a first transparent structure of FIG. 4.

FIG. 4 is a perspective view illustrating an optical microstructure of FIG. 3. FIG. 5 is a top view illustrating a first transparent structure of FIG. 4. Referring to FIG. 3 through FIG. 5, the backlight module 100 further includes a plurality of optical microstructures 140. The optical microstructures 140 are disposed between the supporting surface 112 and the optical film 120, and the light source 130 is adapted to emit the light L towards the optical microstructures 140. Each of the optical microstructures 140 includes a first transparent structure 140a and a second transparent structure 140b. The first transparent structure 140a is connected to the supporting surface 112 and has a front end 142 and a rear end 144 opposite to each other, the front end 142 faces toward the light source 130 and has a first concave surface 142a, and the rear end 144 faces away from the light source 130 and has a convex surface 144a. The second transparent structure 140b is connected to the first transparent structure 140a and located between the first transparent structure 140a and the optical film 120. The second transparent structure 140b has a front surface 146 and a rear surface 148 opposite of each other, the front surface 146 faces toward the light source 130 and tilts in relative to the supporting surface 112, and the rear surface 148 faces away from the light source 130 and tilts in relative to the supporting surface 112. Each of the optical microstructures 140 of the backlight module 100 can guide the light L from the light source 130 via structure features of the first concave surface 142a, the convex surface 144a, the front surface 146 and the rear surface 148 thereof, and the details are as follow.

Figure 6:
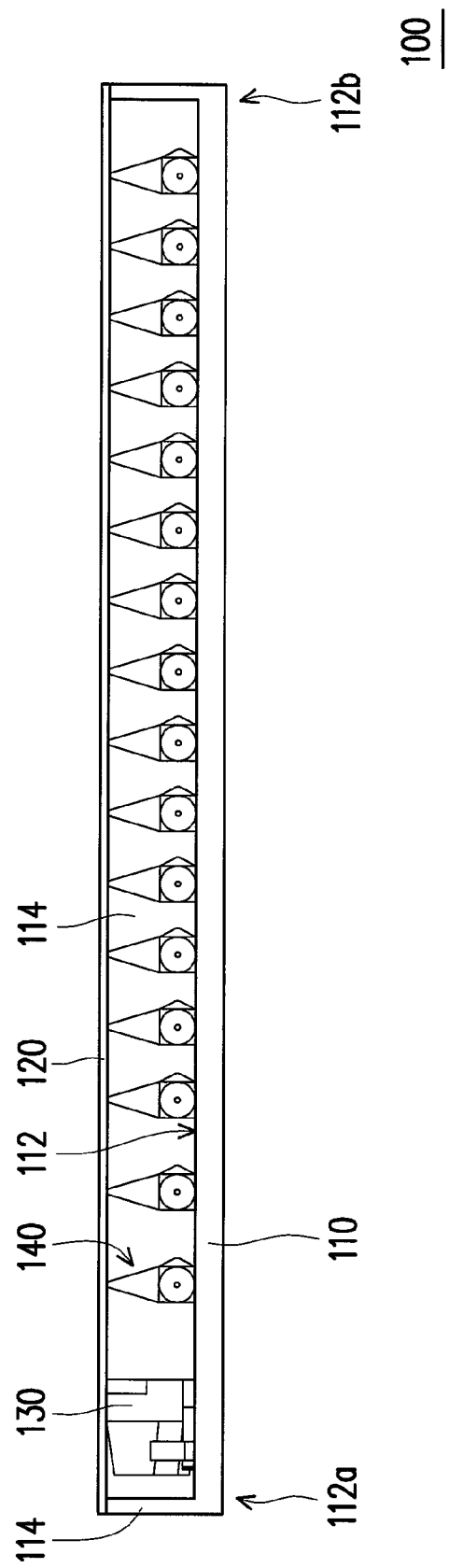
FIG. 6 is a side view illustrating the backlight module of FIG. 1.
Figure 7:
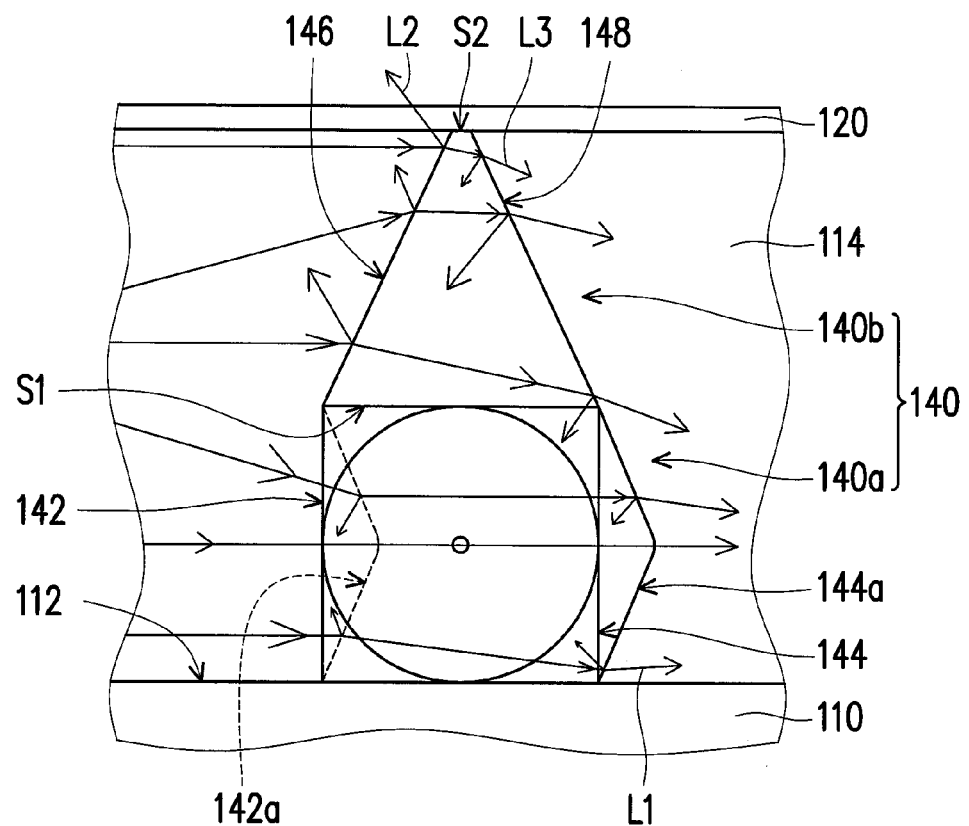
FIG. 7 is a schematic view illustrating light being guided by the optical microstructure of FIG. 3.

FIG. 6 is a side view illustrating the backlight module of FIG. 1. FIG. 7 is a schematic view illustrating light being guided by the optical microstructure of FIG. 3. For clarity of the drawings, parts of the sidewalls 114 shown FIG. 1 and FIG. 2 are not illustrated in FIG. 6. Referring to FIG. 6, the light source 130 as mentioned above is located at the edge 112a of the supporting surface 112, and the optical microstructures 140 are located between the light source 130 and another edge 112b of the supporting surface 112. When the light L (labeled in FIG. 3) emitted by the light source 130 passes through each of the optical microstructures 140, a portion of the light shown in FIG. 7 as guided by the first concave surface 142a and the convex surface 144a is refracted and transmitted towards the edge 112b of the supporting surface 112 (i.e., light labeled as L1 in FIG. 7), so that the light can be uniformly transmitted to each location on the supporting surface 112. Another portion of the light as guided by the front surface 146 is refracted and transmitted towards the optical film 120 (i.e., light labeled as L2 in FIG. 7), so that the light can pass through the optical film 120 and be emitted out. In addition, there is also other portion of the light as guided by the front surface 146 and the rear surface 148 being refracted and transmitted toward the edge 112b of the supporting surface 112 (i.e., light labeled as L3 in FIG. 7).

As shown in FIG. 6, a disposition density of the optical microstructures 140 gradually increases along a direction away from the light source 130, so as to enhance the guidance of the light at locations farther away from the light source 130, thereby enabling the light emission of the backlight module 100 to be more uniform. The disposition density of the optical microstructures 140 may be adjusted according to the needs, and thus effectively enhances the light emission uniformity of the backlight module 100. In addition, a tilted angle of the front surface 146 and the rear surface 148 of the second transparent structure 140b may be adjusted according to the needs, so that the backlight module 100 may have even better light emission uniformity. As a result, a distance between the back plate 110 and optical film 120 is not required to be adjusted for improving the light emission uniformity, and thus a thickness of the backlight module 100 is prevented from being too large, thereby complying with a thinning trend of electronic devices. Moreover, height H of each of the optical microstructures 140 located between the optical film 120 and the supporting surface 112 equals to the gap D between the optical film 120 and the supporting surface 112, so that each of the optical microstructures 140 may support optical film 120 via the second transparent structure 140b thereof, so as to prevent the optical film 120 from having subsidence deformation, thereby ensuring the backlight module 100 to have favorable light emission quality.

In the present embodiment, the optical microstructures 140, for example, are manufactured on the back plate 110 by means of injection molding. In detail, the supporting surface 112 of the back plate 110, for example, has a reflective layer thereon for reflecting the light emitted by the light source 130. When forming the reflective layer on the supporting surface 112 of the back plate 110 by means of injection molding, the optical microstructures 140 may also be formed on the reflective layer by means of injection molding, so that the reflective layer and the first transparent structures 140a and second transparent structures 140b of the optical microstructures 140 are integrally formed. In the other embodiments, the optical microstructures 140 may also be formed through using general screen printing or 3D printing technology, and the invention is not limited thereto.

Figure 8:
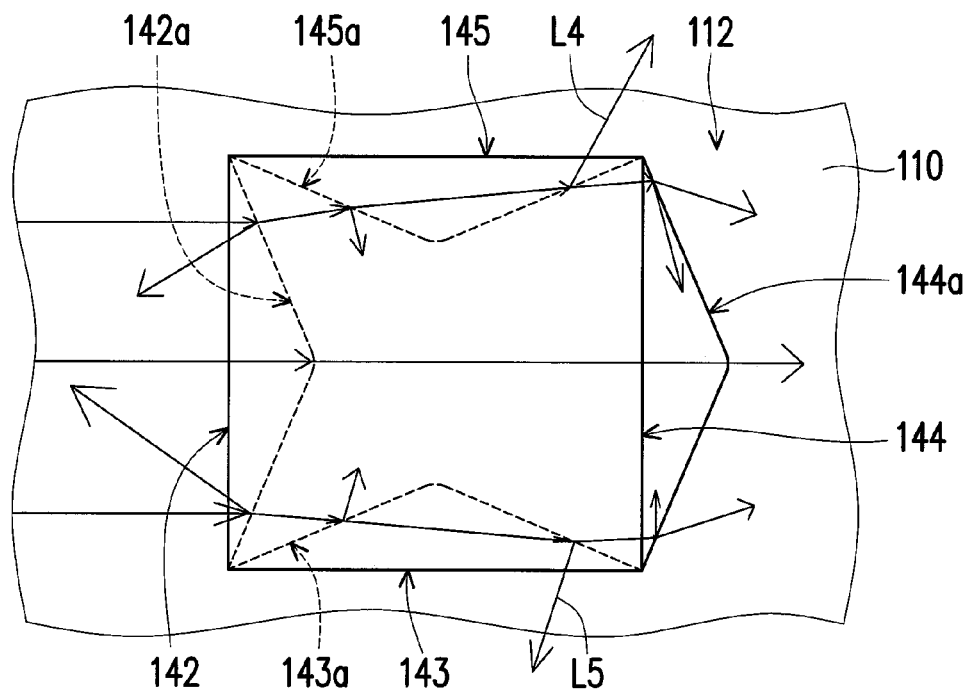
FIG. 8 is a schematic view illustrating light being guided by the optical microstructure of FIG. 5.

Referring to FIG. 3 through FIG. 5, in the present embodiment, each of the first transparent structures 140a further has a first side end 143 and a second side end 145 opposite to each other, the first side end 143 is connected between the front end 142 and the rear end 144 and has a second concave surface 143a, and the second side end 145 is connected between the front end 142 and the rear end 144 and has a third concave surface 145a. FIG. 8 is a schematic view illustrating light being guided by the optical microstructure of FIG. 5. For clarity of the drawings, the second transparent structure 140b shown in FIG. 4 is not illustrated in FIG. 8. Referring to FIG. 8, functions of the second concave surface 143a and the third concave surface 145a are similar to the function of the first concave surface 142a, and the light as guided by the second concave surface 143a and the third concave surface 145a is refracted and transmitted towards to an edge of the supporting surface 112 (i.e., light labeled as L4 and L5 in FIG. 8). The light labeled as L4 in FIG. 8, for example, represents the light being transmitted towards the edge 112c of the supporting surface 112 shown in FIG. 2.

The convex surface 144a, for example, is a convex cambered surface, and the first concave surface 142a, the second concave surface 143a and the third concave surface 145a, for example, are concave cambered surfaces, but the invention is not limited thereto. In the other embodiments, the convex surface 144a may be other types of convex structure, and the first concave surface 142a, the second concave surface 143a and the third concave surface 145a may be other types of concave structures. In addition, in the other embodiments, the first transparent structure 140a may also be without the second concave surface 143a and the third concave surface 145a, and the light may be guided merely by the first concave surface 142a and the convex surface 144a.

As shown in FIG. 3 through FIG. 5, the second transparent structure 140b of the present embodiment further includes a first side surface 147 and a second side surface 149 opposite of each other, the first side surface 147 is connected between the front surface 146 and the rear surface 148 and tilted in relative to the supporting surface 112, and the second side surface 149 is connected between the front surface 146 and the rear surface 148 and titled in relative to the supporting surface 112, so that the second transparent structure 140b appears to be in a square pyramidal shape. Functions of the first side surface 147 and the second side surface 149 are similar to the functions of the front surface 146 and the rear surface 148, and the light as guided by the first side surface 147 and the second side surface 149 is transmitted towards the optical film 120 and then passes through the optical film 120 so as to be emitted out.

Referring to FIG. 7, each of the second transparent structures 140b of the present embodiment, for example, is a pyramidal structure, and this pyramidal structure has a first end surface S1 and a second end surface S2 opposite to each other. An area of the first end surface S1 is greater than an area of the second end surface S2. The first end surface S1 is connected to the first transparent structure 140a, and the second end surface S2 faces toward the optical film 120 and supports the optical film 120. In brief, the second transparent structure 140b is connected to the first transparent structure 140 via an end of thereof that has the larger area, and supports the optical film 120 via an end of thereof that has the smaller area, but the invention is not limited thereto. The second transparent structure may also be connected to the first transparent structure via the end of t thereof that has the smaller area, and support the optical film via the end thereof that has the larger area. Descriptions accompanied by drawings are further provided in detail below.

Figure 9:
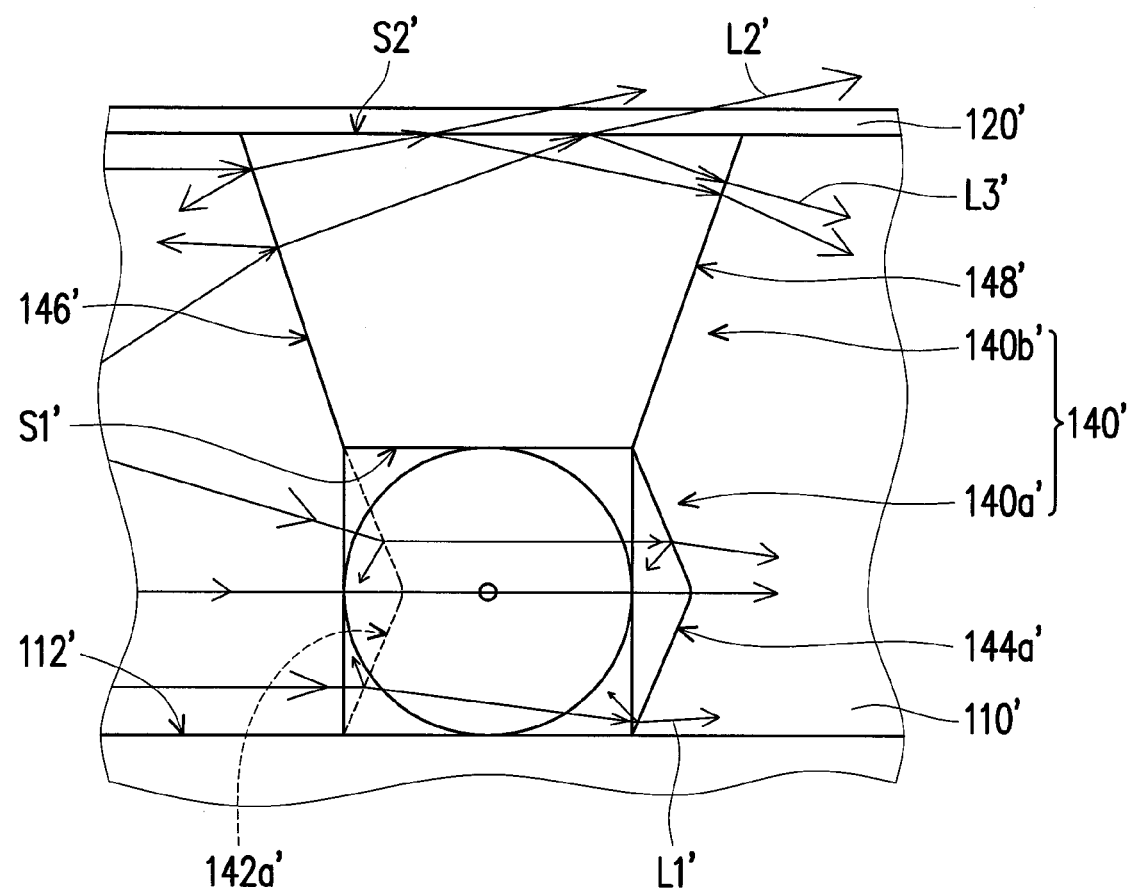
FIG. 9 is a schematic view illustrating light being guided by an optical microstructure according to another embodiment of the invention.

FIG. 9 is a schematic view illustrating light being guided by an optical microstructure according to another embodiment of the invention. Configurations of a back plate 110', an optical film 120' and a first transparent structure 140a' of an optical microstructures 140' shown in FIG. 9 are similar to that of the back plate 110, the optical film 120 and the first transparent structure 140a of the optical microstructure 140 shown in FIG. 7, and thus are not to be repeated herein. Differences between the structure shown in FIG. 9 and the structure shown in FIG. 7 are that, a second transparent structure 140b' of the optical microstructures 140' has a first end surface S1' and a second end surface S2', and an area of the first end surface S1' is smaller than an area of the second end surface S2'. The first end surface S1' is connected to the first transparent structure 140a', and the second end surface S2' faces toward the optical film 120' and supports the optical film 120'.

Similar to the travel path of the light shown in FIG. 7, when the light passes the optical microstructure 140' shown in FIG. 9, a portion of the light as guided by the first concave surface 142a' and the convex surface 144a' is refracted and transmitted to an edge of the supporting surface 112' (i.e., light labeled as L1' in FIG. 9), so that the light can be uniformity transmitted to each location on the supporting surface 112'. Another portion of the light as guided by the front surface 146' is refracted and transmitted to the optical film 120' (i.e., light labeled as L2' in FIG. 9), so that the light can pass through the optical film 120' to be emitted out. In addition, there is also a portion of the light as guided by the front surface 146 and the rear surface 148 being reflected by the optical film 120' during the process refraction, and is transmitted towards the edge of the supporting surface 112' (i.e., light labeled as L3' in FIG. 9).

In the above embodiments, the first transparent structures are all cubic structures, and the second transparent structures are all square pyramidal structures, but the invention does not intended to limit the shape of the optical microstructures; examples accompanied by drawings are provided in detail below.

Figure 10:
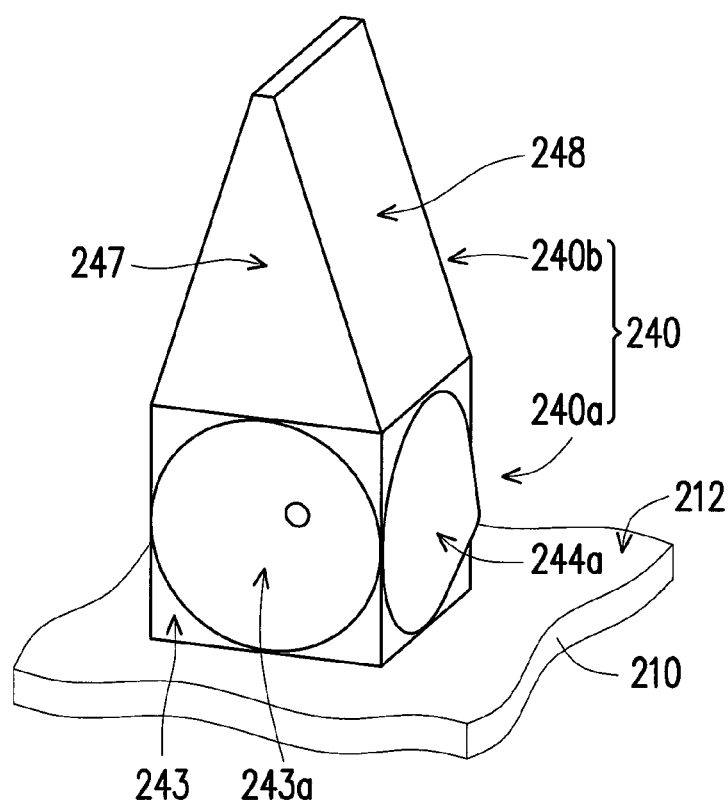
FIG. 10 is a perspective view illustrating an optical microstructure according to another embodiment of the invention.
Figure 11:
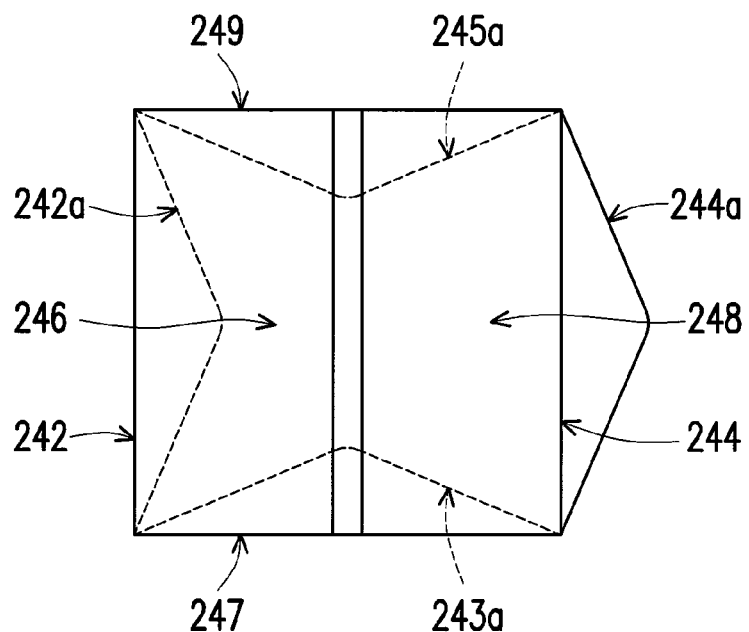
FIG. 11 is a top view illustrating the optical microstructure of FIG. 10.

FIG. 10 is a perspective view illustrating an optical microstructure according to another embodiment of the invention. FIG. 11 is a top view illustrating the optical microstructure of FIG. 10. Referring to FIG. 10 and FIG. 11, in a first transparent structure 240a and a second transparent structure 240b of an optical microstructure 240 of the present embodiment, configurations of a first concave surface 242a, a second concave surface 243a, a third concave surface 245a, a convex surface 244a, a front surface 246 and a rear surface 248 are similar to that of the first concave surface 142a, the second concave surface 143a, the third concave surface 145a, the convex surface 144a, the front surface 146 and the rear surface 148 shown in FIG. 4 and FIG. 5, and thus are not to be repeated herein. A difference between the optical microstructure 240 and the optical microstructure 140 is that, the first side surface 147 and the second side surface 149 of the optical microstructure 140, as mentioned before, are titled in relative to the supporting surface 112 of the back plate 110, while the first side surface 247 and the second side surface 249 of the optical microstructure 240 are perpendicular to the supporting surface 212 of the back plate 210.

Figure 12:
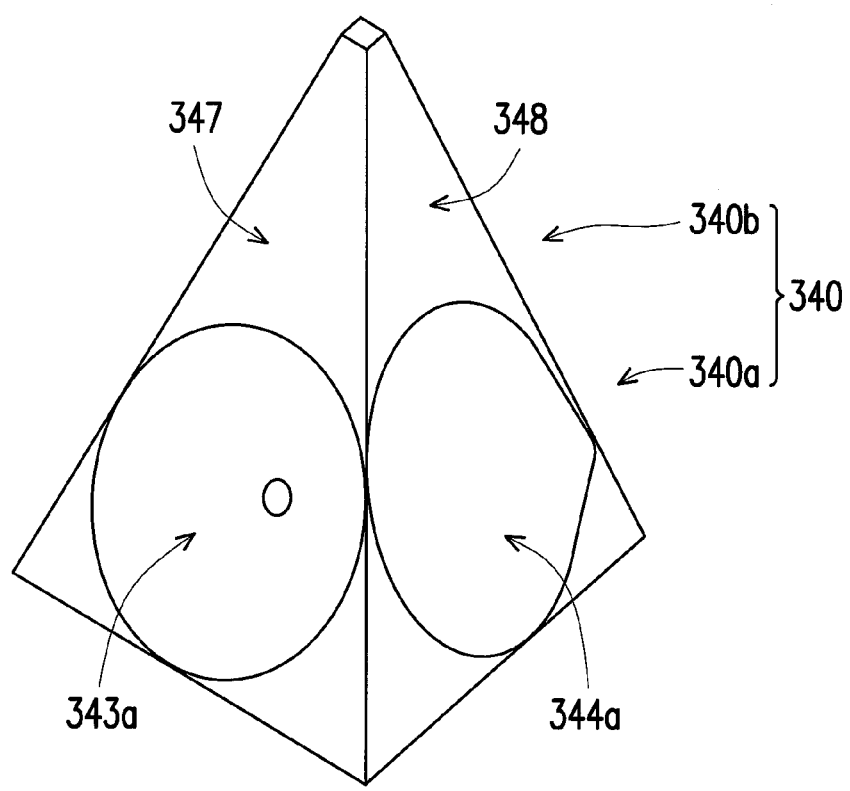
FIG. 12 is a perspective view illustrating an optical microstructure according to another embodiment of the invention.
Figure 13:
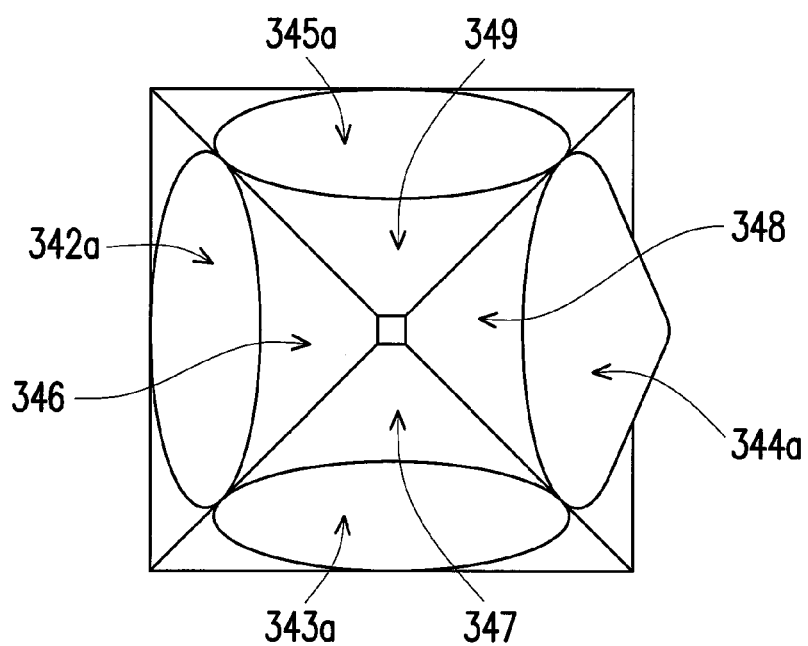
FIG. 13 is a top view illustrating the optical microstructure of FIG. 12.

FIG. 12 is a perspective view illustrating an optical microstructure according to another embodiment of the invention. FIG. 13 is a top view illustrating the optical microstructure of FIG. 12. Referring to FIG. 12 and FIG. 13, in a first transparent structure 340a (viz., lower half portion of the pyramidal structure in the drawing) and a second transparent structure 340b (viz. upper half portion of the pyramidal structure in the drawing) of an optical microstructure 340 of the present embodiment, configurations of a first concave surface 342a, a second concave surface 343a, a third concave surface 345a, a convex surface 344a, a front surface 346, a rear surface 348, a first side surface 347 and a second side surface 349 are similar to that of the first concave surface 142a, the second concave surface 143a, the third concave surface 145a, the convex surface 144a, the front surface 146, the rear surface 148, the first side surface 147 and the second side surface 149 shown in FIG. 4 and FIG. 5, and thus are not to be repeated herein. Differences between the optical microstructure 340 and the optical microstructure 140 are that, the first transparent structure 340a is not a cubic structure, such that the first transparent structure 340a and the second transparent structure 340b together constitute a square pyramidal structure. In other words, in the optical microstructure 340, the first concave surface 342a, the second concave surface 343a, the third concave surface 345a and the convex surface 344a are all formed on the pyramidal structure (viz., the square pyramidal structure constituted by the first transparent structure 340a and the second transparent structure 340b), and are different from the first concave surface 142a, the second concave surface 143a, the third concave surface 145a and the convex surface 144a of optical microstructure 140 that are all formed on the cubic structure (viz. the first transparent structure 140a) other than a pyramidal structure (viz. the second transparent structure 140b).

Figure 14:
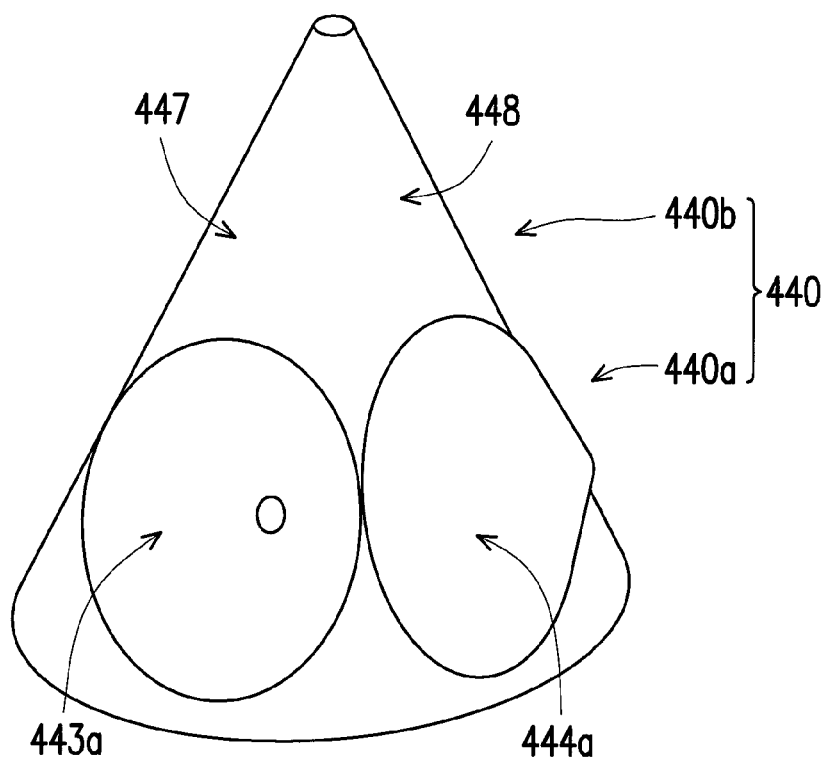
FIG. 14 is a perspective view illustrating an optical microstructure according to another embodiment of the invention.
Figure 15:
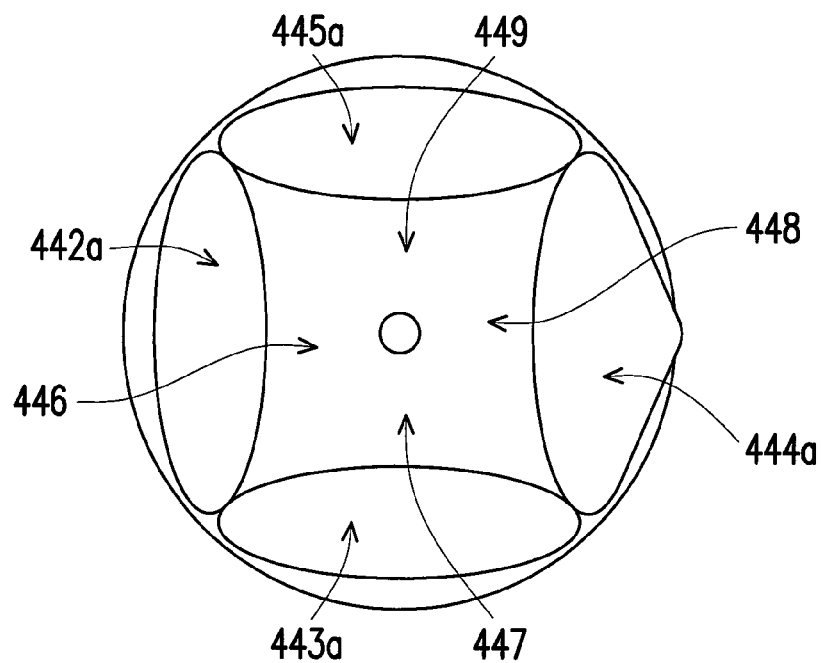
FIG. 15 is a top view illustrating the optical microstructure of FIG. 14.

FIG. 14 is a perspective view illustrating an optical microstructure according to another embodiment of the invention. FIG. 15 is a top view illustrating the optical microstructure of FIG. 14. Referring to FIG. 14 and FIG. 15, in a first transparent structure 440a (viz., lower half portion of the conical structure in the drawing) and a second transparent structure 440b (viz., upper half portion of the conical structure in the drawing) of an optical microstructure 440 of the present embodiment, configurations of a first concave surface 442a, a second concave surface 443a, a third concave surface 445a, a convex surface 444a, a front surface 446, a rear surface 448, a first side surface 447 and a second side surface 449 are similar to that of the first concave surface 342a, the second concave surface 343a, the third concave surface 345a, the convex surface 344a, the front surface 346, the rear surface 348, the first side surface 347 and the second side surface 349 shown in FIG. 12 and FIG. 13, and thus are not to be repeated. A difference between the optical microstructure 440 and the optical microstructure 340 is that, the first transparent structure 440a and the second transparent structure 440b together constitute the conical structure rather than a pyramidal structure.

Figure 16:
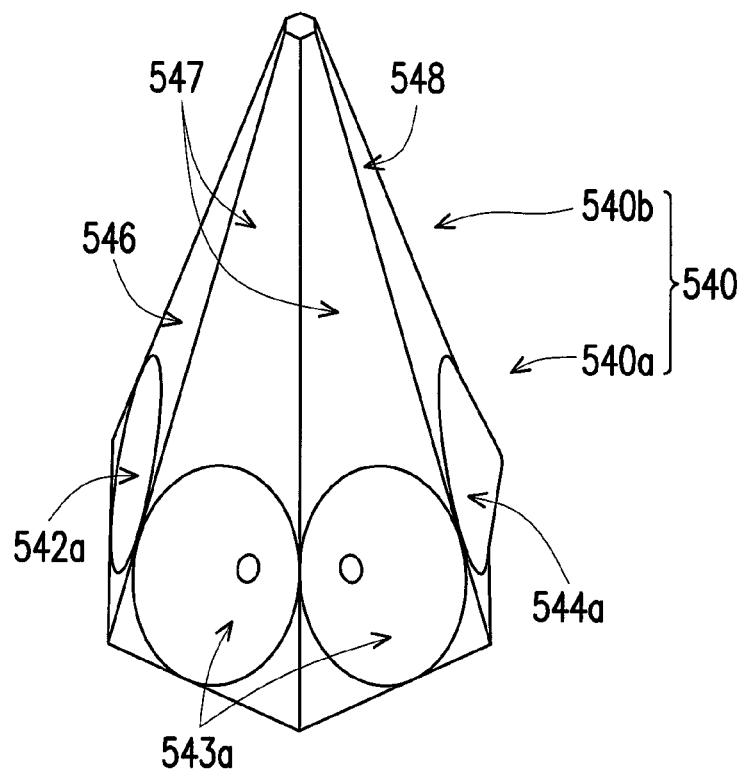
FIG. 16 is a perspective view illustrating an optical microstructure according to another embodiment of the invention.
Figure 17:
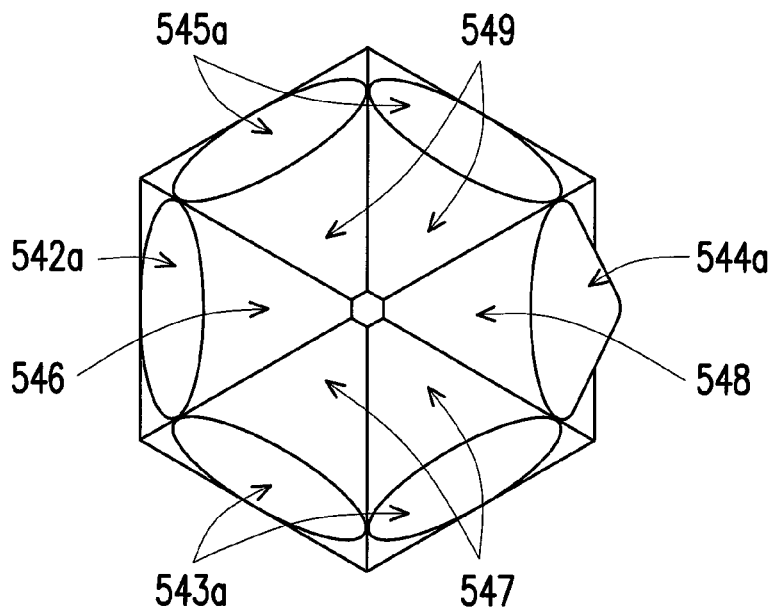
FIG. 17 is a top view illustrating the optical microstructure of FIG. 16.

FIG. 16 is a perspective view illustrating an optical microstructure according to another embodiment of the invention. FIG. 17 is a top view illustrating the optical microstructure of FIG. 16. Referring to FIG. 16 and FIG. 17, in a first transparent structure 540a (viz., upper half portion of the pyramidal structure in the drawing) and a second transparent structure 540b (viz. lower half portion of the pyramidal structure in the drawing) of an optical microstructure 540 of the present embodiment, configurations of a first concave surface 542a, a second concave surface 543a, a third concave surface 545a, a convex surface 544a, a front surface 546, a rear surface 548, a first side surface 547 and a second side surface 549 are similar to that t of the first concave surface 342a, the second concave surface 343a, the third concave surface 345a, the convex surface 344a, the front surface 346, the rear surface 348, the first side surface 347 and the second side surface 349 shown in FIG. 12 and FIG. 13, and thus are not to be repeated herein. A difference between the optical microstructure 540 and the optical microstructure 340 is that, the first transparent structure 540a and the second transparent structure 540b together constitute a hexagonal pyramidal structure rather than a square pyramidal structure.

Summarily, in the backlight module of the invention, the optical microstructures are disposed on the supporting surface of the back plate, and can guide the light from the light source via structure features, such as the first concave surface, the convex surface, the front surface and the rear surface thereof. In detail, a portion of the light passing through the first transparent structures of the optical microstructures as guided by the first concave surface and the convex surface may be uniformly transmitted to each location on the supporting surface, and a portion of the light passing through the second transparent structures of the optical microstructures as guided by the front surface and the rear surface tilted in relative to the supporting surface may be transmitted to the optical film and passed through the optical film so as to be emitted out. By adjusting the disposition density of the optical microstructures and a titled angle of the front surface and the rear surface, light emission uniformity of the backlight module may be improved. As a result, a distance between the back plate and the optical film is not required to be adjusted for improving the light emission uniformity, and thus a thickness of the backlight module is prevented from being too large, thereby complying with a thinning trend of electronic devices. In addition, the optical microstructures located between the optical film and the supporting surface may support the optical film so as to prevent the optical film from having a subsidence deformation, and thus may ensure the backlight module has favorable light emission quality.

It will be apparent to those skilled in the art that various modifications and variations can be made to the structure of the application without departing from the scope or spirit of the application. In view of the foregoing, it is intended that the application cover modifications and variations of this application provided they fall within the scope of the following claims and their equivalents.

What is claimed is:

1. A backlight module comprising:
   a back plate having a supporting surface;
   at least one optical film disposed on the back plate, wherein the supporting surface and the optical film have a gap therebetween;
   a light source disposed at an edge of the supporting surface; and
   a plurality of optical microstructures disposed between the supporting surface and the optical film, wherein the light source is adapted to emit a light towards the optical microstructures, and each of the optical microstructures comprises:
      a first transparent structure connected to the supporting surface and having a front end and a rear end opposite to each other, wherein the front end faces toward the light source and has a first concave surface, and the rear end faces away from the light source and has a convex surface; and
      a second transparent structure connected to the first transparent structure and located between the first transparent structure and the optical film, wherein the second transparent structure has a front surface and a rear surface opposite to each other, the front surface faces toward the light source and tilts in relative to the supporting surface, and the rear surface faces away from the light source and tilts in relative to the supporting surface.

2. The backlight module as recited in claim 1, wherein the optical microstructures are located between the light source and another edge of the supporting surface, and when the light passes through each of the optical microstructures, a portion of the light as guided by the first concave surface and the convex surface is transmitted towards the another edge, and another portion of the light as guided by the front surface and the rear surface is transmitted towards the optical film.

3. The backlight module as recited in claim 1, wherein a height of each of the optical microstructures equals to the gap between the supporting surface and the optical film, so as to enable the second transparent structures to support the optical film.

4. The backlight module as recited in claim 1, wherein the convex surface is a convex cambered surface.

5. The backlight module as recited in claim 1, wherein the first concave surface is a concave cambered surface.

6. The backlight module as recited in claim 1, wherein each of the first transparent structures further has a first side end and a second side end opposite to each other, the first side end is connected between the front end and the rear end and has a second concave surface, and the second side end is connected between the front end and the rear end and has a third concave surface.

7. The backlight module as recited in claim 1, wherein each of the second transparent structures further has a first side surface and a second side surface opposite to each other, the first side surface is connected between the front surface and the rear surface and titled in relative to the supporting surface, and the second side surface is connected between the front surface and the rear surface and tilted in relative to the supporting surface.

8. The backlight module as recited in claim 1, wherein each of the second transparent structures further has a first side surface and a second side surface opposite to each other, the first side surface is connected between the front surface and the rear surface and perpendicular to the supporting surface, and the second side surface is connected between the front surface and the rear surface and perpendicular to the supporting surface.

9. The backlight module as recited in claim 1, wherein each of the second transparent structures is a pyramidal structure.

10. The backlight module as recited in claim 9, wherein the pyramidal structure has a first end surface and a second end surface opposite to each other, the first end surface is connected to the first transparent structure, the second end surface faces towards the optical film, and an area of the first end surface is greater than an area of the second end surface.

11. The backlight module as recited in claim 9, wherein the pyramidal structure has a first end surface and a second end surface opposite to each other, the first end surface is connected to the first transparent structure, the second end surface faces towards the optical film, and an area of the first end surface is smaller than an area of the second end surface.

12. The backlight module as recited in claim 1, wherein each of the first transparent structures and the corresponding second transparent structure together constitute a pyramidal structure or a conical structure.

13. The backlight module as recited in claim 1, wherein a disposition density of the optical microstructures gradually increases along a direction away from the light source.

14. The backlight module as recited in claim 1, wherein the back plate has a plurality of sidewalls, and the sidewalls surround the supporting surface and support the periphery of the optical film.

15. The backlight module as recited in claim 1, wherein the first transparent structure and the second transparent structure are integrally formed.

* * * * *